United States Patent
Nakai

(10) Patent No.: US 10,032,274 B2
(45) Date of Patent: *Jul. 24, 2018

(54) CALIBRATION APPARATUS AND CALIBRATION METHOD

(71) Applicant: Panasonic Intellectual Property Management Co., Ltd., Osaka (JP)

(72) Inventor: Wataru Nakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,682

(22) Filed: Mar. 27, 2015

(65) Prior Publication Data

US 2015/0287197 A1 Oct. 8, 2015

(30) Foreign Application Priority Data

Apr. 2, 2014 (JP) ................. 2014-075915

(51) Int. Cl.
*H04N 17/00* (2006.01)
*H04N 17/02* (2006.01)
(Continued)

(52) U.S. Cl.
CPC ............ *G06T 7/0018* (2013.01); *B60R 1/00* (2013.01); *G06K 9/00791* (2013.01);
(Continued)

(58) Field of Classification Search
CPC ............... H04N 17/002; G06T 7/0018
(Continued)

(56) References Cited

U.S. PATENT DOCUMENTS 6,985,619 B1 * 1/2006 Seta ............... G06K 9/00798
345/419
9,092,695 B1 * 7/2015 Ogale ............... G06K 9/6202
(Continued)

FOREIGN PATENT DOCUMENTS

| JP | 2008-011174 | 1/2008 |
| JP | 2008-109481 A | 5/2008 |
| JP | 2011-239349 A | 11/2011 |
| WO | 2012/145818 | 11/2012 |

OTHER PUBLICATIONS

The Extended European Search Report dated Aug. 4, 2015 for the related European Patent Application No. 15160026.9.
(Continued)

*Primary Examiner* — Jefferey F Harold
*Assistant Examiner* — Omer Khalid
(74) *Attorney, Agent, or Firm* — Greenblum & Bernstein, P.L.C.

(57) ABSTRACT

There is provided a calibration apparatus for calculating a camera installation parameter with respect to a flat surface without preparing two sets of parallel lines on the flat surface, with respect to which the camera installation parameter is to be obtained. An acquirer acquires a photographed image of two linearly-extending lines substantially perpendicular to a flat surface. An extractor extracts the two linearly-extending lines from the acquired image through image processing. A calculator calculates a vanishing point from the extracted two linearly-extending lines and calculates a camera installation parameter with respect to the flat surface on the basis of coordinates of the vanishing point and given coordinates different from the coordinates of the vanishing point.

12 Claims, 14 Drawing Sheets

(51) Int. Cl.
*G06T 7/00* (2017.01)
*G06K 9/46* (2006.01)
*G06T 11/20* (2006.01)
*G06K 9/00* (2006.01)
*B60R 1/00* (2006.01)
*G06T 7/80* (2017.01)
*G06T 7/536* (2017.01)
*G06T 7/579* (2017.01)

(52) U.S. Cl.
CPC ............ *G06K 9/4604* (2013.01); *G06T 7/536* (2017.01); *G06T 7/579* (2017.01); *G06T 7/80* (2017.01); *G06T 11/203* (2013.01); *B60R 2300/402* (2013.01); *G06T 2207/30244* (2013.01); *G06T 2207/30252* (2013.01)

(58) Field of Classification Search
USPC .......................................... 348/187
See application file for complete search history.

(56) References Cited

U.S. PATENT DOCUMENTS

| | | | |
|---|---|---|---|
| 2008/0007619 A1* | 1/2008 | Shima | G06T 7/80 348/118 |
| 2010/0134688 A1* | 6/2010 | Moriwake | G06K 9/00228 348/586 |
| 2012/0081512 A1* | 4/2012 | Shimizu | G06K 9/00798 348/36 |
| 2013/0070108 A1* | 3/2013 | Aerts | G06T 7/002 348/187 |
| 2015/0178922 A1* | 6/2015 | Nakai | G06T 7/80 348/187 |

OTHER PUBLICATIONS

Ling-Ling Wang et al., "Camera Calibration by Vanishing Lines for 3D Computer Vision", IEEE Transactions on Pattern Analysis and Machine Intelligence, vol. 13, No. 4, pp. 370-376, Apr. 1991.

* cited by examiner

CALIBRATION APPARATUS AND CALIBRATION METHOD

BACKGROUND

1. Technical Field

The present disclosure relates to calibration involving calculating a camera installation parameter on the basis of an image photographed by a camera.

2. Description of the Related Art

A technique for measuring the distance between a vehicle and an object in front of or behind the vehicle using a camera installed at the vehicle to issue a warning to a driver has been prevalent in recent years. To accurately measure the distance between the vehicle and the object, it is desirable to accurately calculate an installation location and an installation angle of the camera with respect to the vehicle (perform calibration).

Common calibration techniques for obtaining an installation angle of a camera with respect to a vehicle include a technique utilizing a point (vanishing point) where parallel straight lines in a real space intersect in an image space.

The calibration technique utilizing a vanishing point calculates a camera installation angle from at least two vanishing points, a vanishing point (depth vanishing point) calculated from parallel lines parallel to a traveling direction of the vehicle and a vanishing point calculated from any other parallel lines.

A camera installation angle will be referred to as a camera installation parameter hereinafter.

Calibration techniques for calculating a camera installation parameter utilizing a vanishing point include a technique for extracting two sets of parallel lines in a real space from a photographed image of a road marking, graphic feature quantities of which are stored in advance, to calculate two vanishing points from the extracted two sets of parallel lines (Japanese Unexamined Patent Application Publication No. 2008-11174).

SUMMARY

To calculate a camera installation parameter with respect to a flat surface by the technique disclosed in Japanese Unexamined Patent Application Publication No. 2008-11174 described above, it is necessary to prepare two sets of parallel lines on the flat surface, with respect to which the camera installation parameter is to be obtained, or extract two sets of parallel lines on the flat surface.

One non-limiting and exemplary embodiment provides a calibration apparatus, a calibration method, a camera having a calibration function, and a program capable of calculating a camera installation parameter with respect to a flat surface without use of two sets of parallel lines on the flat surface, with respect to which the camera installation parameter is to be obtained.

In one general aspect, the techniques disclosed here feature a calibration apparatus for calculating a camera installation parameter with respect to a flat surface, the calibration apparatus including an acquirer which acquires a photographed image of two linearly-extending lines substantially perpendicular to the flat surface, an extractor which extracts the two linearly-extending lines from the image acquired by the acquirer through image processing, and a calculator which calculates a vanishing point from the two linearly-extending lines extracted by the extractor and calculates the camera installation parameter with respect to the flat surface on a basis of coordinates of the vanishing point and given coordinates different from the coordinates of the vanishing point.

The camera installation parameter with respect to the flat surface here is based on the definition of a camera coordinate system as having a $Z_c$ axis along an optical axis of a camera, a $Y_c$ axis along a direction perpendicular to the $Z_c$ axis and extending upward from the camera, and an $X_c$ axis along a direction perpendicular to the $Z_c$ axis and the $Y_c$ axis and the definitions of a roll angle, a pitch angle, and a yaw angle which are camera installation parameters as a rotation angle about the $Z_c$ axis, a rotation angle about the $X_c$ axis, and a rotation angle about the $Y_c$ axis and refers to the roll angle and the pitch angle at the time of rotation in the order of yaw angle, pitch angle, and roll angle.

According to the present disclosure, it is possible to calculate a camera installation parameter with respect to a flat surface without use of two sets of parallel lines on the flat surface, with respect to which the camera installation parameter is to be obtained.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below with reference to the drawings. Note that although the embodiments of the present disclosure will be described in the context of a case where a camera is installed at a vehicle as a movable body, the present disclosure is not limited to a case where a camera is installed at a movable body.

First Embodiment

A calibration apparatus according to a first embodiment of the present disclosure will be described below.

Figure 1:
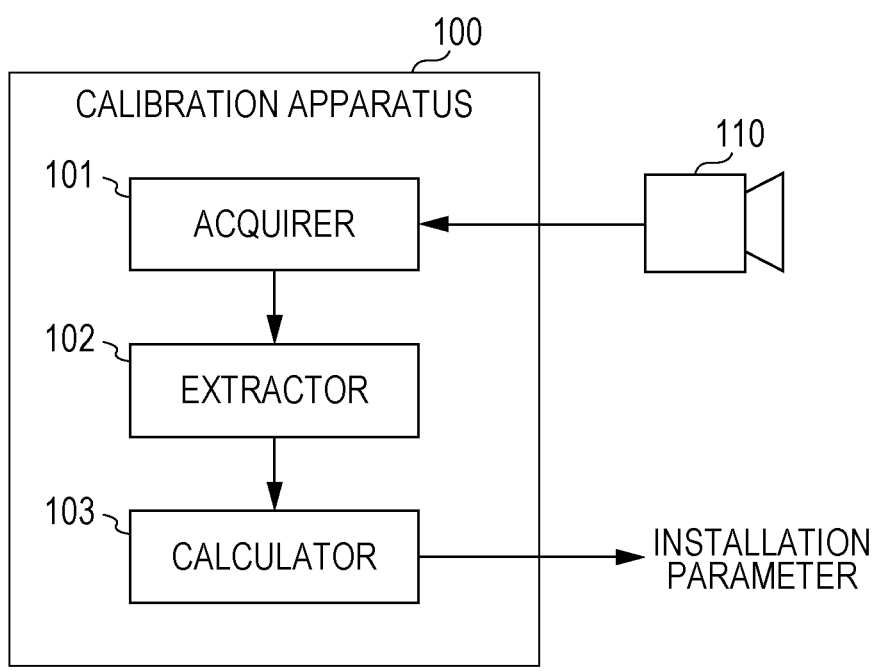
FIG. 1 is a block diagram showing an example of the configuration of a calibration apparatus according to a first embodiment of the present disclosure.

FIG. 1 is a block diagram showing the configuration of a calibration apparatus 100 according to the first embodiment of the present disclosure.

In FIG. 1, an acquirer 101 acquires an image which is photographed by a camera 110 installed at a vehicle and includes two linearly-extending lines substantially perpendicular to a movement flat surface (for example, a road surface). An extractor 102 extracts, through image processing, the two linearly-extending lines substantially perpendicular to the movement flat surface from the image acquired by the acquirer 101. A calculator 103 calculates camera installation parameters with respect to the movement flat surface from the two linearly-extending lines extracted by the extractor 102.

Figure 2:
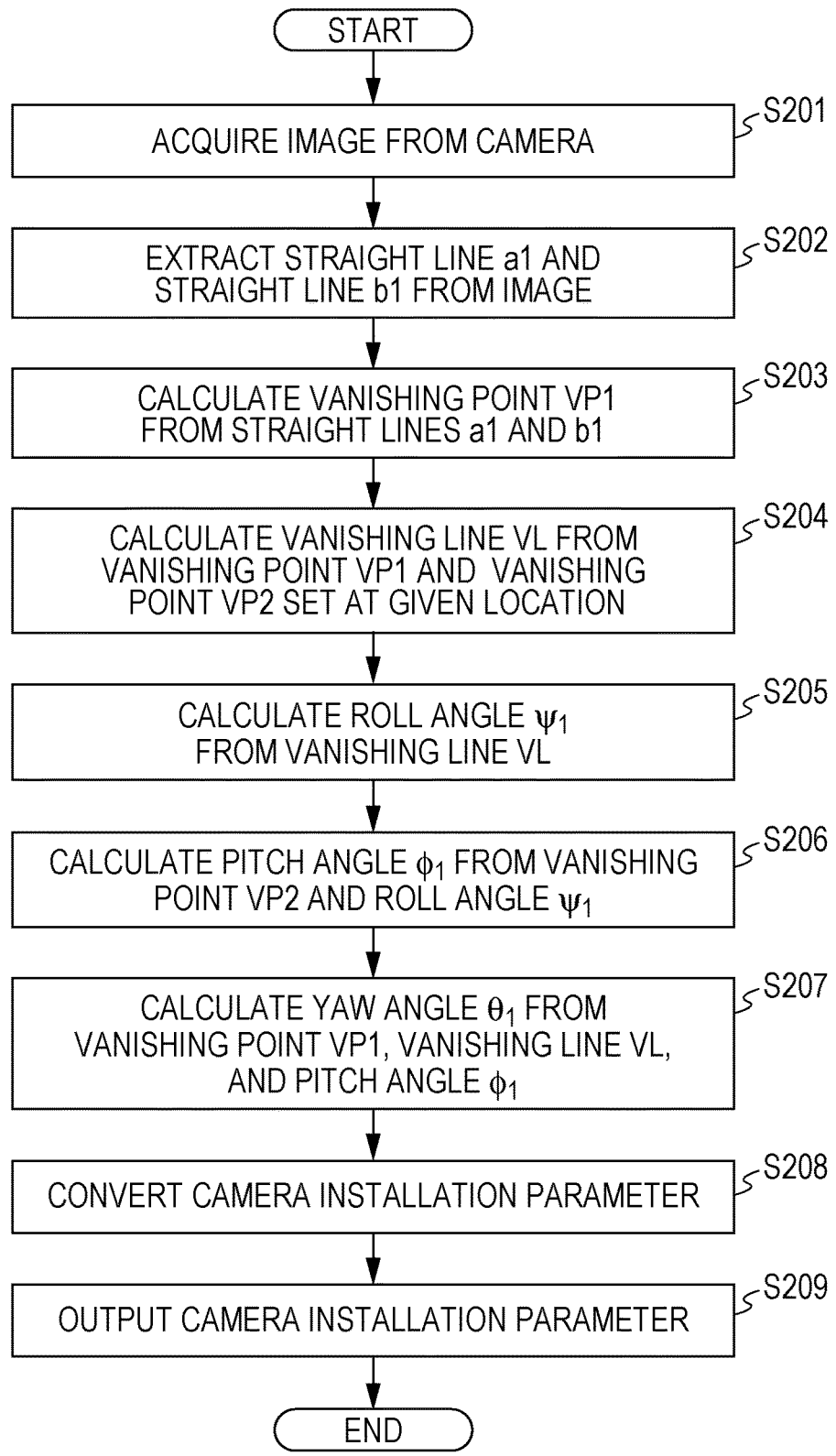
FIG. 2 is a flowchart showing an example of the operation of the calibration apparatus according to the first embodiment of the present disclosure.
Figure 3:
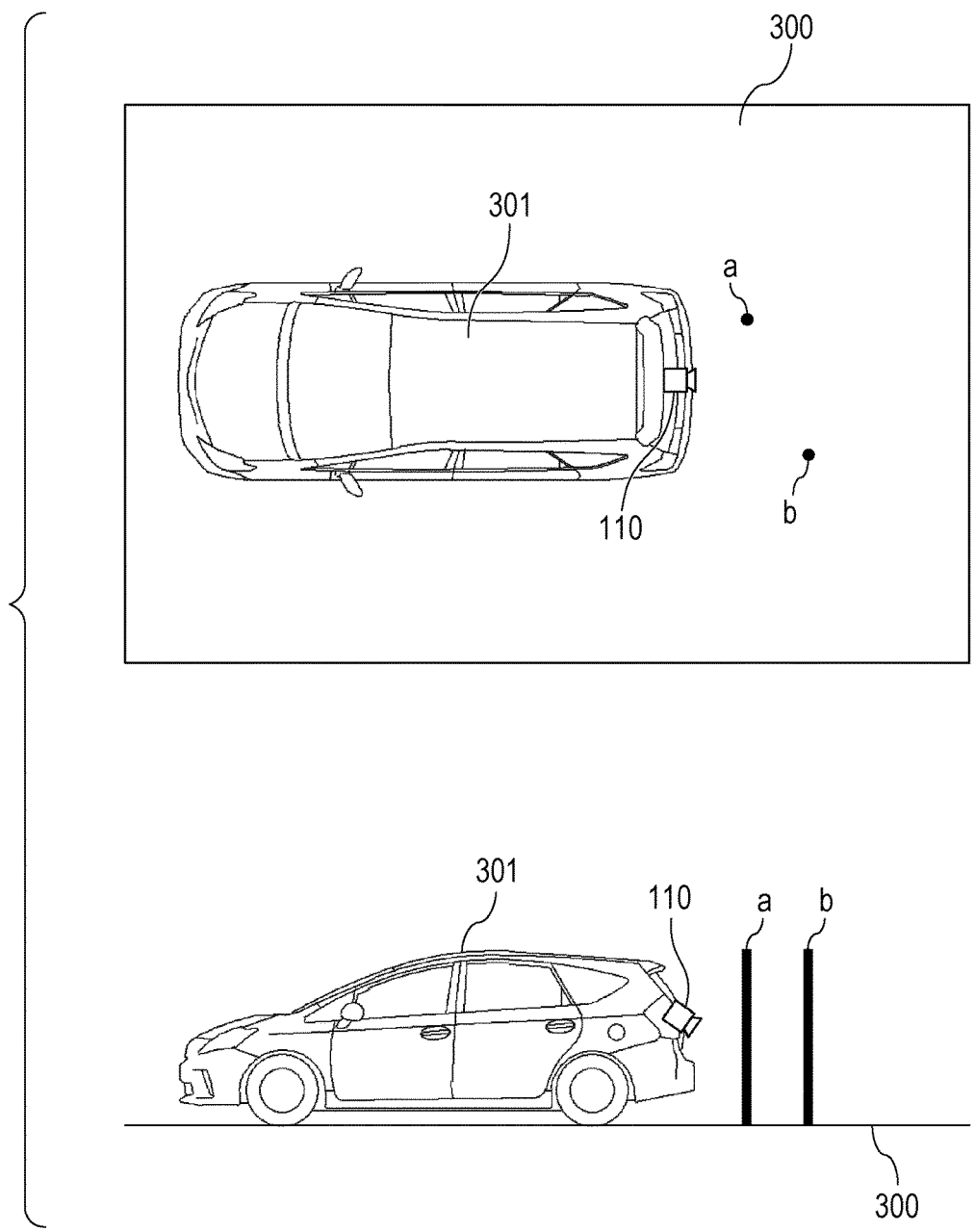
FIG. 3 is an explanatory view showing how the calibration apparatus according to the first embodiment of the present disclosure acquires an image from a camera.

FIG. 2 is a flowchart showing the operation of the calibration apparatus 100. FIG. 3 is an explanatory view showing how the vehicle is arranged when the acquirer 101 of the calibration apparatus 100 acquires an image from the camera 110.

In FIG. 3, a first straight line a and a second straight line b are substantially perpendicular to a movement flat surface 300. The first straight line a and the second straight line b are two substantially perpendicular linearly-extending lines which are drawn on, for example, two cylindrical solids standing substantially perpendicularly to the movement flat surface 300 or a flat plate standing substantially perpendicularly to the movement flat surface 300.

The first straight line a and the second straight line b are desired to be located such that a photographed camera image includes both of the straight lines. A movement flat surface here refers to a flat surface on which a vehicle moves and may be a surface angled with respect to a horizontal plane.

The acquirer 101 acquires a photographed image of the first straight line a and the second straight line b from the camera 110 installed at a vehicle 301 which is arranged at a location shown in FIG. 3 (step S201).

Figure 4:
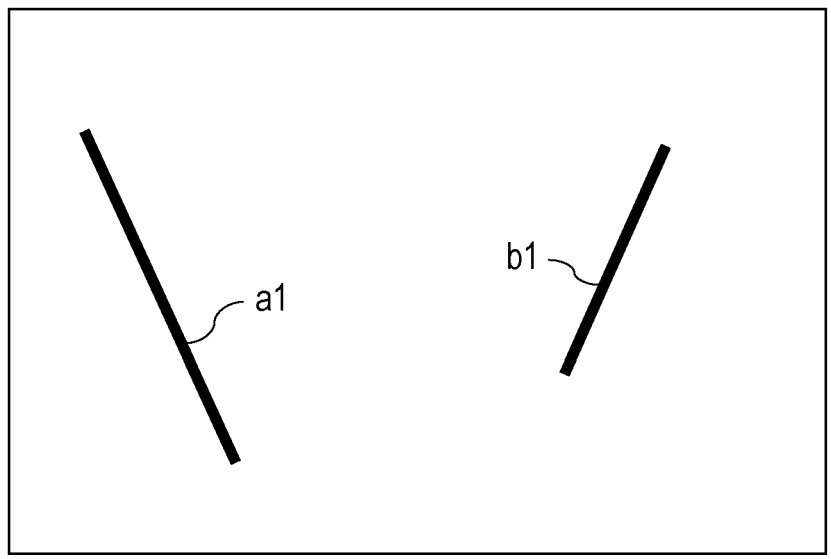
FIG. 4 is an explanatory view showing an image photographed by the camera according to the first embodiment of the present disclosure.

FIG. 4 is an explanatory view showing the image acquired by the acquirer 101 in step S201. A straight line a1 in FIG. 4 corresponds to the first straight line a in FIG. 3, and a straight line b1 corresponds to the second straight line b in FIG. 3.

The image acquired by the acquirer 101 is input to the extractor 102. The extractor 102 extracts the straight line a1 and the straight line b1 from the input image through image processing, such as comparing luminance at pixels of the image (step S202).

The straight line a1 and the straight line b1 extracted in step S202 are input to the calculator 103.

The calculator 103 calculates camera installation parameters with respect to a movement flat surface from the straight line a1 and the straight line b1 extracted by the extractor 102 and a point set as a vanishing point at a given location.

The calculator 103 calculates, as a vanishing point VP1, an intersection of an extended line of the straight line a1 extracted by the extractor 102 and an extended line of the straight line b1 (step S203).

Figure 5:
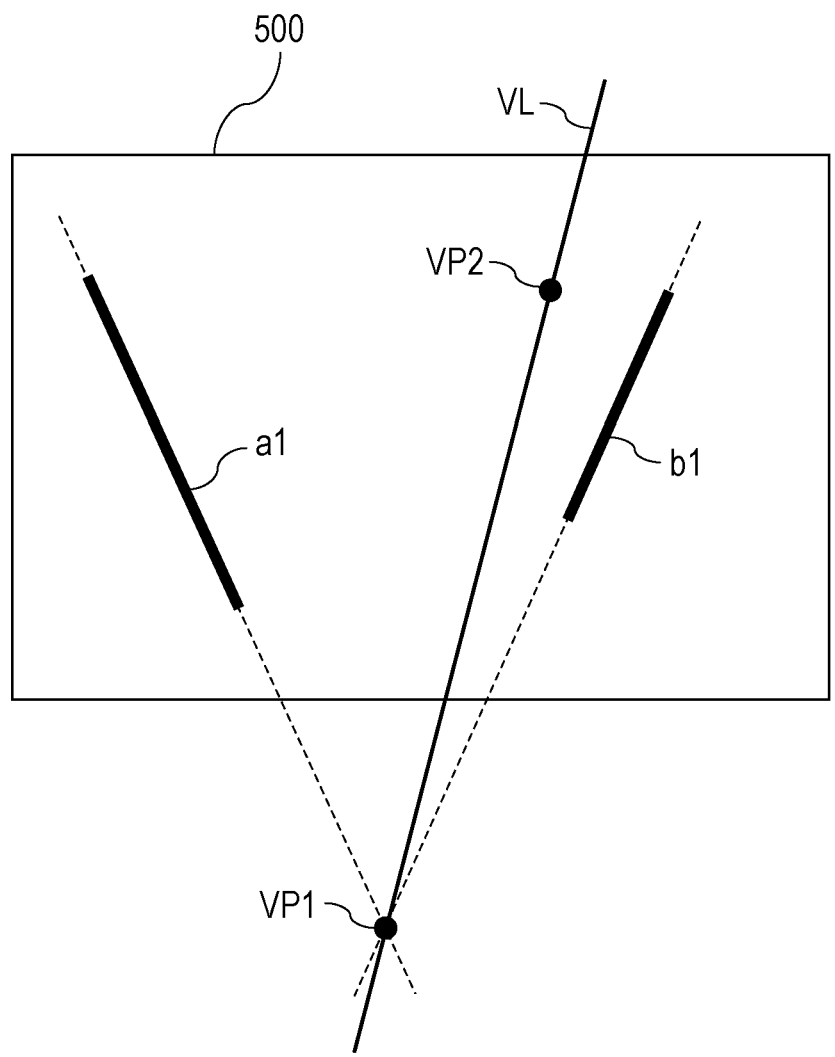
FIG. 5 is a conceptual view for explaining the operation of a calculator according to the first embodiment of the present disclosure.

The calculator 103 calculates, as a vanishing line VL, a line passing through the vanishing point VP1 calculated in step S203 and a vanishing point VP2 which is set at a given location different from that of the vanishing point VP1 (step S204). FIG. 5 shows an example of the positional relation among the vanishing point VP1, the vanishing point VP2, and the vanishing line VL. Although the vanishing point VP2 is present within an image 500 in FIG. 5, the vanishing point VP2 may be present at any location as long as the location is in an image space.

Figure 6A:
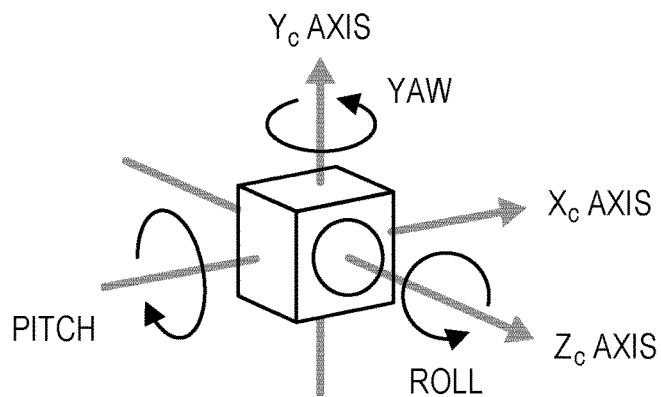
FIGS. 6A to 6C are explanatory views for explaining definitions of coordinate systems according to the first embodiment of the present disclosure.

In the present embodiment, a camera coordinate system is defined so as to have a $Z_c$ axis along an optical axis of the camera, a $Y_c$ axis along a direction perpendicular to the $Z_c$ axis and extending upward from the camera, and an $X_c$ axis along a direction perpendicular to the $Z_c$ axis and the $Y_c$ axis, as shown in FIG. 6A. Of camera installation parameters, a roll angle, a pitch angle, and a yaw angle are defined as a rotation angle about the $Z_c$ axis, a rotation angle about the $X_c$ axis, and a rotation angle about the $Y_c$ axis, respectively.

Figure 6B:
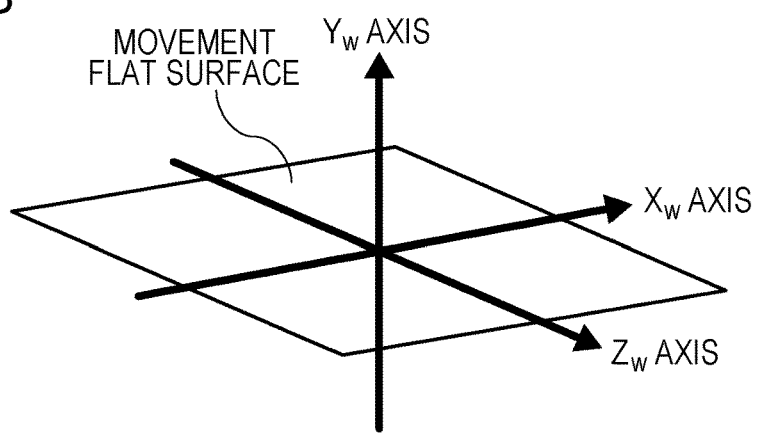

A world coordinate system is defined so as to have a $Y_w$ axis perpendicular to the movement flat surface and an $X_w$ axis and a $Z_w$ axis perpendicular to the $Y_w$ axis and perpendicular to each other, as shown in FIG. 6B.

As described above, camera installation parameters in the present embodiment are only installation angles and are defined so as not to include installation locations. That is, origins of the camera coordinate system and the world coordinate system coincide with each other, and the relation between coordinates $(X_c, Y_c, Z_c)$ in the camera coordinate system and coordinates $(X_w, Y_w, Z_w)$ in the world coordinate system is represented by Expression 1 including multiplication of three rotation matrices:

$$\begin{bmatrix} x_c \\ y_c \\ z_c \end{bmatrix} = \begin{bmatrix} \cos\varphi & \sin\varphi & 0 \\ -\sin\varphi & \cos\varphi & 0 \\ 0 & 0 & 1 \end{bmatrix} \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} x_w \\ y_w \\ z_w \end{bmatrix}$$ [Expression 1]

where φ represents a roll angle, ϕ represents a pitch angle, and θ represents a yaw angle.

Expression 1 indicates that coordinates obtained by rotating the coordinates $(X_w, Y_w, Z_w)$ in the world coordinate system in the order of yaw angle, pitch angle, and roll angle are the coordinates $(X_c, Y_c, Z_c)$ in the camera coordinate system.

The relation between the coordinates $(X_c, Y_c, Z_c)$ in the camera coordinate system and the coordinates $(X_w, Y_w, Z_w)$ in the world coordinate system is defined by rotation angles as camera installation parameters and a rotation order as an order in which the camera installation parameters are applied. For this reason, even if the relation between the coordinates $(X_c, Y_c, Z_c)$ in the camera coordinate system and the coordinates $(X_w, Y_w, Z_w)$ in the world coordinate system is the same, for example, rotation angles for the rotation order of yaw angle, pitch angle, and roll angle and rotation angles for the rotation order of yaw angle, roll angle, and pitch angle do not necessarily coincide with each other.

Thus, the same relation between the coordinates $(X_c, Y_c, Z_c)$ in the camera coordinate system and the coordinates $(X_w, Y_w, Z_w)$ in the world coordinate system can be expressed with different camera installation parameters by changing the rotation order.

In a calibration method utilizing a vanishing point described in the present disclosure, Japanese Unexamined Patent Application Publication No. 2008-11174, and "Camera Calibration by Vanishing Lines for 3D Computer Vision" (to be described later), camera installation parameters in expression form for rotation in the rotation order of yaw angle, pitch angle, and roll angle as in Expression 1 are calculated.

Figure 6C:
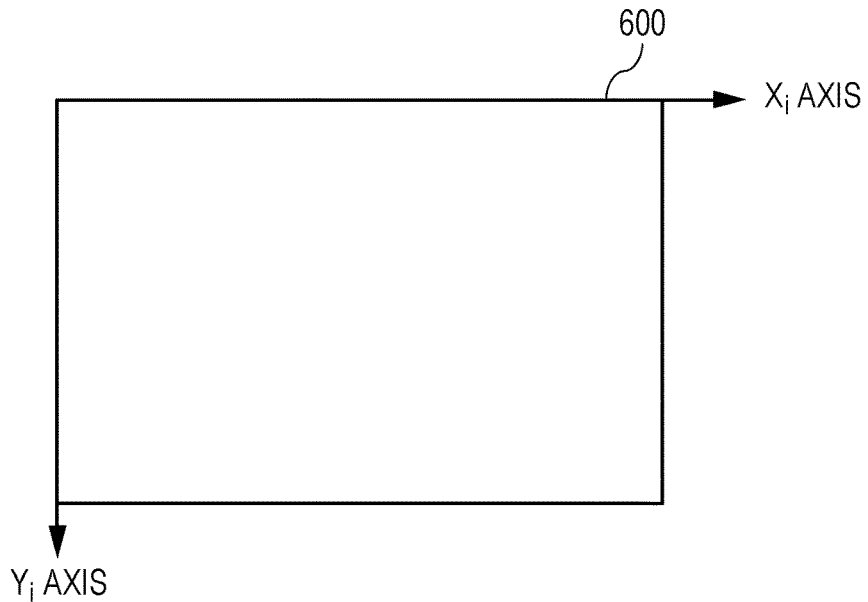

A coordinate system in an image space is defined so as to have an origin at an upper left corner of an image 600, an $X_i$ axis along a rightward direction, and a $Y_i$ axis along a downward direction, as shown in FIG. 6C.

The calculator 103 calculates, as a roll angle $\varphi_1$, an angle which a straight line parallel to the $X_i$ axis forms with the vanishing line VL calculated in step S204 (step S205). The calculator 103 calculates a pitch angle $\phi_1$, using a focal length of the camera 110, coordinates of the vanishing point VP2 set at the given location, and the roll angle $\varphi_1$ calculated in step S205 (step S206). The calculator 103 calculates a yaw angle $\theta_1$, using the focal length of the camera 110, coordinates of the vanishing point VP1 calculated in step S203, the vanishing line VL calculated in step S204, and the pitch angle $\phi_1$ calculated in step S206 (step S207).

The relation among world coordinate systems and the camera coordinate system in the processes from step S204 to step S207 will be described.

Figure 7A:
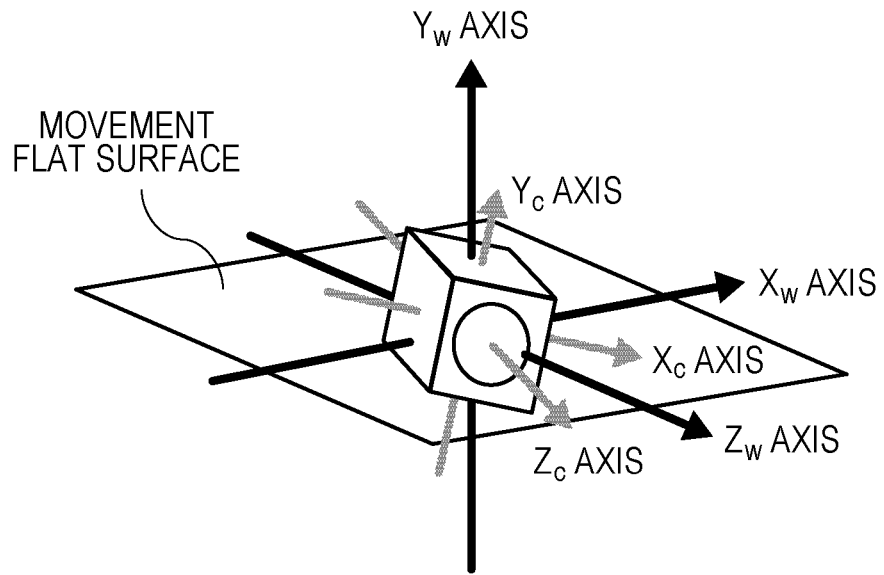
FIGS. 7A and 7B are explanatory views for explaining the relation between a world coordinate system and a camera coordinate system and the relation between an orthogonal world coordinate system and the camera coordinate system, according to the first embodiment of the present disclosure.

FIG. 7A is a view showing the relation between the world coordinate system and the camera coordinate system, between which coordinate conversion is performed on the basis of camera installation parameters calculated using parallel lines parallel to a movement flat surface, as illustrated in Japanese Unexamined Patent Application Publication No. 2008-11174 or "Camera Calibration by Vanishing Lines for 3D Computer Vision" (to be described later).

Camera installation parameters calculated using two sets of parallel lines parallel to a movement flat surface that are illustrated in Japanese Unexamined Patent Application Publication No. 2008-11174 or "Camera Calibration by Vanishing Lines for 3D Computer Vision" (to be described later) are camera installation parameters for converting coordinates in the world coordinate system having the $Z_w$ axis parallel to one set of parallel lines of the two sets of parallel lines, the $Y_w$ axis perpendicular to a surface (the movement flat surface) parallel to the two sets of parallel lines, and the $X_w$ axis perpendicular to the $Z_w$ axis and the $Y_w$ axis to coordinates in the camera coordinate system.

In the present embodiment, parallel lines used to calculate camera installation parameters are substantially perpendicular to a movement flat surface. For this reason, camera installation parameters calculated by the processes from step S204 to step S207 are camera installation parameters for converting coordinates in a world coordinate system shown in FIG. 7B to coordinates in the camera coordinate system.

That is, the camera installation parameters calculated by the processes from step S204 to step S207 are camera installation parameters for converting coordinates in a world coordinate system having a $Z_{w'}$ axis perpendicular to the movement flat surface and an $X_{w'}$ axis and a $Y_{w'}$ axis perpendicular to the $Z_{w'}$ axis and perpendicular to each other to coordinates in the camera coordinate system.

In the present embodiment, there is only one vanishing point that is calculated from two linearly-extending lines substantially perpendicular to a movement flat surface, and an arbitrarily set point is adopted as the other vanishing point. Setting the other vanishing point is equivalent to setting a flat surface (orthogonal flat surface) substantially perpendicular to a movement flat surface for calculating the vanishing point. That is, setting the other vanishing point leads to identifying the $X_{w'}$ axis and the $Y_{w'}$ axis for the movement flat surface. The world coordinate system represented by the $X_{w'}$ axis, the $Y_{w'}$ axis, and the $Z_{w'}$ axis will be referred to as an orthogonal world coordinate system hereinafter.

Note that a method for calculating camera installation parameters from vanishing points and a vanishing line is described in detail in Ling-Ling Wang et al., "Camera Calibration by Vanishing Lines for 3D Computer Vision", IEEE TRANSACTIONS on Pattern Analysis and Machine_Intelligence, Vol. 13, No. 4, pp. 370-376, April 1991.

The method by Ling-Ling Wang et al. calculates a roll angle from a vanishing line connecting two vanishing points, calculates a pitch angle from the vanishing points and the roll angle, and calculates a yaw angle from the vanishing points, the vanishing line, and the pitch angle. That is, if two vanishing points are not calculated (for example, if only one vanishing point is calculated), neither a roll angle, a pitch angle, nor a yaw angle can be calculated. To calculate camera installation parameters, presence of two sets of parallel lines on a movement flat surface is necessary.

Figure 7B:
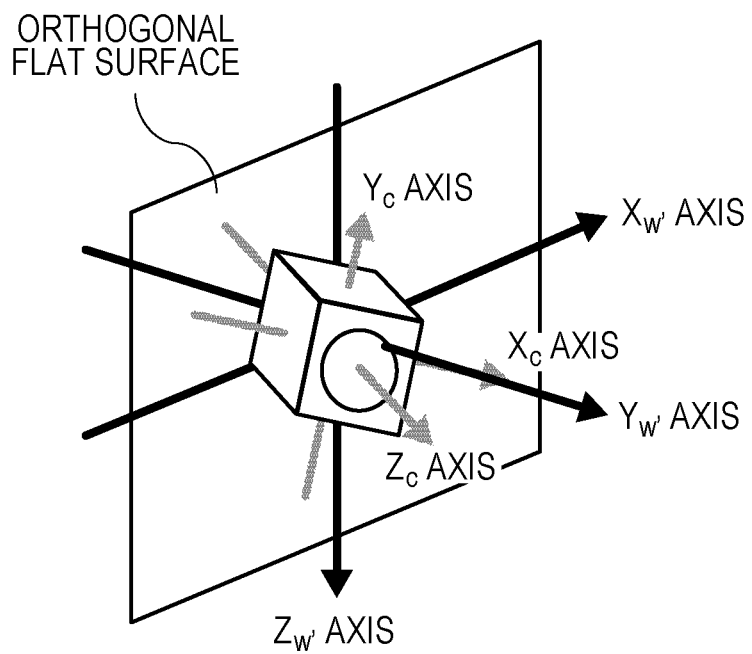

The calculator 103 converts the camera installation parameters for converting coordinates in the orthogonal world coordinate system as shown in FIG. 7B to coordinates in the camera coordinate system to camera installation parameters for converting coordinates in the world coordinate system as shown in FIG. 7A to coordinates in the camera coordinate system (step S208).

Camera installation parameters with respect to the movement flat surface are camera installation parameters for converting coordinates in the world coordinate system as shown in FIG. 7A to coordinates in the camera coordinate system. To calculate camera installation parameters for converting coordinates in the world coordinate system as shown in FIG. 7A to coordinates in the camera coordinate system from camera installation parameters for converting coordinates in the orthogonal world coordinate system as shown in FIG. 7B to coordinates in the camera coordinate system, camera installation parameters for converting coordinates in the world coordinate system as shown in FIG. 7A to coordinates in the orthogonal world coordinate system as shown in FIG. 7B may be used.

That is, the equivalence between converting coordinates in the world coordinate system as shown in FIG. 7A to coordinates in the orthogonal world coordinate system as shown in FIG. 7B and then converting the coordinates to coordinates in the camera coordinate system and converting coordinates in the world coordinate system as shown in FIG. 7A to coordinates in the camera coordinate system is used.

Assuming that the camera installation parameters calculated in steps S204 to S207 are the roll angle $\varphi_1$, the pitch angle $\phi_1$, and the yaw angle $\theta_1$, the relation between coordinates $(X_{w'}, Y_{w'}, Z_{w'})$ in the orthogonal world coordinate system and the coordinates $(X_c, Y_c, Z_c)$ in the camera coordinate system is represented by Expression 2:

$$\begin{bmatrix} x_c \\ y_c \\ z_c \end{bmatrix} = \begin{bmatrix} \cos\psi_1 & \sin\psi_1 & 0 \\ -\sin\psi_1 & \cos\psi_1 & 0 \\ 0 & 0 & 1 \end{bmatrix} \begin{bmatrix} 1 & 0 & 0 \\ 0 & \cos\phi_1 & \sin\phi_1 \\ 0 & -\sin\phi_1 & \cos\phi_1 \end{bmatrix}$$ [Expression 2]

$$\begin{bmatrix} \cos\theta_1 & 0 & -\sin\theta_1 \\ 0 & 1 & 0 \\ \sin\theta_1 & 0 & \cos\theta_1 \end{bmatrix} \begin{bmatrix} x_{w'} \\ y_{w'} \\ z_{w'} \end{bmatrix}$$

Figure 8:
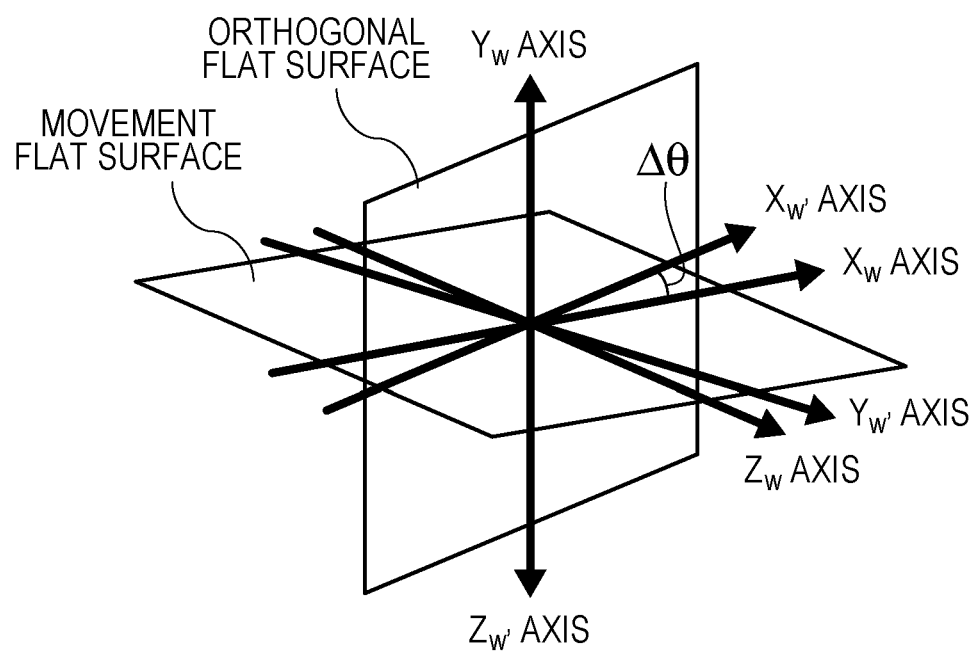
FIG. 8 is an explanatory view for explaining the relation between the world coordinate system and the orthogonal world coordinate system, according to the first embodiment of the present disclosure.

The relation between the orthogonal world coordinate system and the world coordinate system is as shown in FIG. 8. From this, the relation between the coordinates $(X_w, Y_w, Z_w)$ in the world coordinate system and the coordinates $(X_{w'}, Y_{w'}, Z_{w'})$ in the orthogonal world coordinate system is represented by Expression 3:

$$\begin{bmatrix} x_{w'} \\ y_{w'} \\ z_{w'} \end{bmatrix} = \begin{bmatrix} \cos 0 & \sin 0 & 0 \\ -\sin 0 & \cos 0 & 0 \\ 0 & 0 & 1 \end{bmatrix} \begin{bmatrix} 1 & 0 & 0 \\ 0 & \cos\pi/2 & \sin\pi/2 \\ 0 & -\sin\pi/2 & \cos\pi/2 \end{bmatrix}$$ [Expression 3]

$$\begin{bmatrix} \cos\Delta\theta & 0 & -\sin\Delta\theta \\ 0 & 1 & 0 \\ \sin\Delta\theta & 0 & \cos\Delta\theta \end{bmatrix} \begin{bmatrix} x_w \\ y_w \\ z_w \end{bmatrix}$$

where $\Delta\theta$ represents the relation between the movement flat surface and the $X_{w'}$ axis and $Y_{w'}$ axis that is determined by an arbitrarily set point, that is, an angle which the $X_w$ axis forms with the $X_{w'}$ axis or an angle which the $Z_w$ axis forms with the $Y_{w'}$ axis.

The camera installation parameters for converting the coordinates $(X_w, Y_w, Z_w)$ in the world coordinate system to the coordinates $(X_c, Y_c, Z_c)$ in the camera coordinate system are calculated by Expression 2 and Expression 3.

Both sides of Expression 3 are left multiplied by rotation matrices in the order of yaw angle $\theta_1$, pitch angle $\phi_1$, and roll angle $\varphi_1$ to obtain Expression 4:

$$\begin{bmatrix} \cos\psi_1 & \sin\psi_1 & 0 \\ -\sin\psi_1 & \cos\psi_1 & 0 \\ 0 & 0 & 1 \end{bmatrix} \begin{bmatrix} 1 & 0 & 0 \\ 0 & \cos\phi_1 & \sin\phi_1 \\ 0 & -\sin\phi_1 & \cos\phi_1 \end{bmatrix}$$ [Expression 4]

$$\begin{bmatrix} \cos\theta_1 & 0 & -\sin\theta_1 \\ 0 & 1 & 0 \\ \sin\theta_1 & 0 & \cos\theta_1 \end{bmatrix}$$

$$\begin{bmatrix} x_{w'} \\ y_{w'} \\ z_{w'} \end{bmatrix} = \begin{bmatrix} \cos\psi_1 & \sin\psi_1 & 0 \\ -\sin\psi_1 & \cos\psi_1 & 0 \\ 0 & 0 & 1 \end{bmatrix} \begin{bmatrix} 1 & 0 & 0 \\ 0 & \cos\phi_1 & \sin\phi_1 \\ 0 & -\sin\phi_1 & \cos\phi_1 \end{bmatrix}$$

$$\begin{bmatrix} \cos\theta_1 & 0 & -\sin\theta_1 \\ 0 & 1 & 0 \\ \sin\theta_1 & 0 & \cos\theta_1 \end{bmatrix} \begin{bmatrix} \cos 0 & \sin 0 & 0 \\ -\sin 0 & \cos 0 & 0 \\ 0 & 0 & 1 \end{bmatrix}$$

$$\begin{bmatrix} 1 & 0 & 0 \\ 0 & \cos\pi/2 & \sin\pi/2 \\ 0 & -\sin\pi/2 & \cos\pi/2 \end{bmatrix}$$

$$\begin{bmatrix} \cos\Delta\theta & 0 & -\sin\Delta\theta \\ 0 & 1 & 0 \\ \sin\Delta\theta & 0 & \cos\Delta\theta \end{bmatrix} \begin{bmatrix} x_w \\ y_w \\ z_w \end{bmatrix}$$

Since the right side of Expression 2 is equal to the left side of Expression 4, Expression 4 is transformed into Expression 5:

$$\begin{bmatrix} x_c \\ y_c \\ z_c \end{bmatrix} = \begin{bmatrix} \cos\psi_1 & \sin\psi_1 & 0 \\ -\sin\psi_1 & \cos\psi_1 & 0 \\ 0 & 0 & 1 \end{bmatrix} \begin{bmatrix} 1 & 0 & 0 \\ 0 & \cos\phi_1 & \sin\phi_1 \\ 0 & -\sin\phi_1 & \cos\phi_1 \end{bmatrix}$$ [Expression 5]

$$\begin{bmatrix} \cos\theta_1 & 0 & -\sin\theta_1 \\ 0 & 1 & 0 \\ \sin\theta_1 & 0 & \cos\theta_1 \end{bmatrix} \begin{bmatrix} \cos 0 & \sin 0 & 0 \\ -\sin 0 & \cos 0 & 0 \\ 0 & 0 & 1 \end{bmatrix}$$

$$\begin{bmatrix} 1 & 0 & 0 \\ 0 & \cos\pi/2 & \sin\pi/2 \\ 0 & -\sin\pi/2 & \cos\pi/2 \end{bmatrix} \begin{bmatrix} \cos\Delta\theta & 0 & -\sin\Delta\theta \\ 0 & 1 & 0 \\ \sin\Delta\theta & 0 & \cos\Delta\theta \end{bmatrix} \begin{bmatrix} x_w \\ y_w \\ z_w \end{bmatrix}$$

A relational expression between the coordinates $(X_w, Y_w, Z_w)$ in the world coordinate system and the coordinates $(X_c, Y_c, Z_c)$ in the camera coordinate system is derived as Expression 5. However, camera installation parameters to be applied in the rotation order of yaw angle, pitch angle, and roll angle cannot be obtained. For this reason, a process is performed of integrating six rotation matrices on the right side of Expression 5 into three rotation matrices for a yaw angle, a pitch angle, and a roll angle.

A fourth matrix from the left on the right side is a unit matrix and can be removed. Expression 5 is transformed into Expression 6:

$$\begin{bmatrix} x_c \\ y_c \\ z_c \end{bmatrix} = \begin{bmatrix} \cos\psi_1 & \sin\psi_1 & 0 \\ -\sin\psi_1 & \cos\psi_1 & 0 \\ 0 & 0 & 1 \end{bmatrix} \begin{bmatrix} 1 & 0 & 0 \\ 0 & \cos\phi_1 & \sin\phi_1 \\ 0 & -\sin\phi_1 & \cos\phi_1 \end{bmatrix} \quad \text{[Expression 6]}$$

$$\begin{bmatrix} \cos\theta_1 & 0 & -\sin\theta_1 \\ 0 & 1 & 0 \\ \sin\theta_1 & 0 & \cos\theta_1 \end{bmatrix}$$

$$\begin{bmatrix} 1 & 0 & 0 \\ 0 & \cos\pi/2 & \sin\pi/2 \\ 0 & -\sin\pi/2 & \cos\pi/2 \end{bmatrix} \begin{bmatrix} \cos\Delta\theta & 0 & -\sin\Delta\theta \\ 0 & 1 & 0 \\ \sin\Delta\theta & 0 & \cos\Delta\theta \end{bmatrix} \begin{bmatrix} x_w \\ y_w \\ z_w \end{bmatrix}$$

Rotation matrices for a pitch angle are integrated. The rotation matrices for a pitch angle can be expressed using the sum of angles, as shown in Expression 7, by multiplying the rotation matrices for a pitch angle.

$$\begin{bmatrix} 1 & 0 & 0 \\ 0 & \cos\alpha & \sin\alpha \\ 0 & -\sin\alpha & \cos\alpha \end{bmatrix} \begin{bmatrix} 1 & 0 & 0 \\ 0 & \cos\beta & \sin\beta \\ 0 & -\sin\beta & \cos\beta \end{bmatrix} = \quad \text{[Expression 7]}$$

$$\begin{bmatrix} 1 & 0 & 0 \\ 0 & \cos(\alpha+\beta) & \sin(\alpha+\beta) \\ 0 & -\sin(\alpha+\beta) & \cos(\alpha+\beta) \end{bmatrix}$$

At this time, the rotation matrices for a pitch angle are second and fourth ones from the left on the right side of Expression 6. For this reason, a process is performed of converting first to third matrices from the left on the right side of Expression 6, in which the rotation order for camera installation parameters is yaw angle, pitch angle, and roll angle, such that the rotation order for camera installation parameters is pitch angle, yaw angle, and roll angle, and making the rotation matrices for a pitch angle adjacent to each other.

The relation between coordinates in the camera coordinate system and coordinates in the world coordinate system when rotation order is pitch angle, yaw angle, and roll angle is represented by Expression 8:

$$\begin{bmatrix} x_c \\ y_c \\ z_c \end{bmatrix} = \begin{bmatrix} \cos\psi_2 & \sin\psi_2 & 0 \\ -\sin\psi_2 & \cos\psi_2 & 0 \\ 0 & 0 & 1 \end{bmatrix} \begin{bmatrix} \cos\theta_2 & 0 & -\sin\theta_2 \\ 0 & 1 & 0 \\ \sin\theta_2 & 0 & \cos\theta_2 \end{bmatrix} \quad \text{[Expression 8]}$$

$$\begin{bmatrix} 1 & 0 & 0 \\ 0 & \cos\phi_2 & \sin\phi_2 \\ 0 & -\sin\phi_2 & \cos\phi_2 \end{bmatrix}$$

$$\begin{bmatrix} 1 & 0 & 0 \\ 0 & \cos\pi/2 & \sin\pi/2 \\ 0 & -\sin\pi/2 & \cos\pi/2 \end{bmatrix} \begin{bmatrix} \cos\Delta\theta & 0 & -\sin\Delta\theta \\ 0 & 1 & 0 \\ \sin\Delta\theta & 0 & \cos\Delta\theta \end{bmatrix} \begin{bmatrix} x_w \\ y_w \\ z_w \end{bmatrix}$$

where $\varphi_2$ represents a roll angle after the conversion, $\theta_2$ represents a yaw angle after the conversion, and $\phi_2$ represents a pitch angle after the conversion.

Since the product of rotation matrices in Expression 6 and the product of rotation matrices in Expression 8 are equal, the roll angle $\varphi_2$, the pitch angle $\phi_2$, and the yaw angle $\theta_2$ are calculated by solving the relational expression below Expression 9 indicating the products of rotation matrices and constants.

$$\begin{bmatrix} \cos\psi_2\cos\theta_2 & \sin\psi_2\cos\phi_2 + \cos\psi_2\sin\theta_2\sin\phi_2 & \sin\psi_2\sin\phi_2 - \cos\psi_2\sin\theta_2\cos\phi_2 \\ -\sin\psi_2\cos\theta_2 & \cos\psi_2\cos\phi_2 - \sin\psi_2\sin\theta_2\sin\phi_2 & \cos\psi_2\sin\phi_2 + \sin\psi_2\sin\theta_2\cos\phi_2 \\ \sin\theta_2 & -\cos\theta_2\sin\phi_2 & \cos\theta_2\cos\phi_2 \end{bmatrix} = \quad \text{[Expression 9]}$$

$$\begin{bmatrix} C_1 & C_2 & C_3 \\ C_4 & C_5 & C_6 \\ C_7 & C_8 & C_9 \end{bmatrix}$$

where $C_1$ to $C_9$ represent constants calculated by the relational expression below Expression 10:

$$\begin{bmatrix} C_1 & C_2 & C_3 \\ C_4 & C_5 & C_6 \\ C_7 & C_8 & C_9 \end{bmatrix} = \begin{bmatrix} \cos\psi_1 & \sin\psi_1 & 0 \\ -\sin\psi_1 & \cos\psi_1 & 0 \\ 0 & 0 & 1 \end{bmatrix} \quad \text{[Expression 10]}$$

$$\begin{bmatrix} 1 & 0 & 0 \\ 0 & \cos\phi_1 & \sin\phi_1 \\ 0 & -\sin\phi_1 & \cos\phi_1 \end{bmatrix} \begin{bmatrix} \cos\theta_1 & 0 & -\sin\theta_1 \\ 0 & 1 & 0 \\ \sin\theta_1 & 0 & \cos\theta_1 \end{bmatrix}$$

Since the rotation matrices for a pitch angle lie side by side, the rotation matrices can be multiplied. Expression 8 is transformed into Expression 11:

$$\begin{bmatrix} x_c \\ y_c \\ z_c \end{bmatrix} = \begin{bmatrix} \cos\psi_2 & \sin\psi_2 & 0 \\ -\sin\psi_2 & \cos\psi_2 & 0 \\ 0 & 0 & 1 \end{bmatrix} \begin{bmatrix} \cos\theta_2 & 0 & -\sin\theta_2 \\ 0 & 1 & 0 \\ \sin\theta_2 & 0 & \cos\theta_2 \end{bmatrix} \quad \text{[Expression 11]}$$

$$\begin{bmatrix} 1 & 0 & 0 \\ 0 & \cos(\phi_2+\pi/2) & \sin(\phi_2+\pi/2) \\ 0 & -\sin(\phi_2+\pi/2) & \cos(\phi_2+\pi/2) \end{bmatrix}$$

$$\begin{bmatrix} \cos\Delta\theta & 0 & -\sin\Delta\theta \\ 0 & 1 & 0 \\ \sin\Delta\theta & 0 & \cos\Delta\theta \end{bmatrix} \begin{bmatrix} x_w \\ y_w \\ z_w \end{bmatrix}$$

The calculator 103 performs a process of converting first to third matrices from the left on the right side of Expression 11, in which the rotation order for camera installation parameters is pitch angle, yaw angle, and roll angle, such that the rotation order for camera installation parameters is yaw angle, pitch angle, and roll angle. That is, the camera installation parameters are converted to camera installation parameters to be applied in the original rotation order.

The relation between coordinates in the world coordinate system and coordinates in the camera coordinate system when the rotation order is pitch angle, yaw angle, and roll angle is represented by Expression 12:

$$\begin{bmatrix} x_c \\ y_c \\ z_c \end{bmatrix} = \begin{bmatrix} \cos\psi_3 & \sin\psi_3 & 0 \\ -\sin\psi_3 & \cos\psi_3 & 0 \\ 0 & 0 & 1 \end{bmatrix} \begin{bmatrix} 1 & 0 & 0 \\ 0 & \cos\phi_3 & \sin\phi_3 \\ 0 & -\sin\phi_3 & \cos\phi_3 \end{bmatrix}$$

$$\begin{bmatrix} \cos\theta_3 & 0 & -\sin\theta_3 \\ 0 & 1 & 0 \\ \sin\theta_3 & 0 & \cos\theta_3 \end{bmatrix} \begin{bmatrix} \cos\Delta\theta & 0 & -\sin\Delta\theta \\ 0 & 1 & 0 \\ \sin\Delta\theta & 0 & \cos\Delta\theta \end{bmatrix} \begin{bmatrix} x_w \\ y_w \\ z_w \end{bmatrix}$$

[Expression 12]

where $\varphi_3$ represents a roll angle after the conversion, $\phi_3$ represents a pitch angle after the conversion, and $\theta_3$ represents a yaw angle after the conversion.

The yaw angle $\theta_3$, the pitch angle $\phi_3$, and the roll angle $\varphi_3$ after the change of the rotation order for camera installation parameters can be calculated by solving the relational expression below (Expression 13):

$$\begin{bmatrix} \cos\theta_3\cos\psi_3 + \sin\theta_3\sin\phi_3\sin\psi_3 & \cos\phi_3\sin\psi_3 & -\sin\theta_3\cos\psi_3 + \cos\theta_3\sin\phi_3\sin\psi_3 \\ -\cos\theta_3\sin\psi_3 + \sin\theta_3\sin\phi_3\cos\psi_3 & \cos\phi_3\cos\psi_3 & \sin\theta_3\sin\psi_3 + \cos\theta_3\sin\phi_3\cos\psi_3 \\ \sin\theta_3\cos\phi_3 & -\sin\phi_3 & \cos\theta_3\cos\phi_3 \end{bmatrix} =$$

$$\begin{bmatrix} C'_1 & C'_2 & C'_3 \\ C'_4 & C'_5 & C'_6 \\ C'_7 & C'_8 & C'_9 \end{bmatrix}$$

[Expression 13]

where $C'_1$ to $C'_9$ represent constants calculated by the relational expression below Expression 14:

$$\begin{bmatrix} C'_1 & C'_2 & C'_3 \\ C'_4 & C'_5 & C'_6 \\ C'_7 & C'_8 & C'_9 \end{bmatrix} =$$

$$\begin{bmatrix} \cos\psi_2 & \sin\psi_2 & 0 \\ -\sin\psi_2 & \cos\psi_2 & 0 \\ 0 & 0 & 1 \end{bmatrix} \begin{bmatrix} \cos\theta_2 & 0 & -\sin\theta_2 \\ 0 & 1 & 0 \\ \sin\theta_2 & 0 & \cos\theta_2 \end{bmatrix}$$

$$\begin{bmatrix} 1 & 0 & 0 \\ 0 & \cos(\phi_2 + \pi/2) & \sin(\phi_2 + \pi/2) \\ 0 & -\sin(\phi_2 + \pi/2) & \cos(\phi_2 + \pi/2) \end{bmatrix}$$

[Expression 14]

Note that conversion has been performed in Expression 8 such that the rotation order of first to third matrices from the left on the right side is pitch angle, yaw angle, and roll angle. The present disclosure is not limited to the rotation order, and rotation for a pitch angle only needs to be the third.

Rotation matrices for a yaw angle are integrated. In the case of a yaw angle, the product of matrices can be expressed using the sum of angles, like the case of a pitch angle. Since the rotation matrices for a yaw angle are third and fourth ones from the left on the right side in Expression 12, the rotation matrices are multiplied without change. The product is represented by Expression 15:

$$\begin{bmatrix} x_c \\ y_c \\ z_c \end{bmatrix} = \begin{bmatrix} \cos\psi_3 & \sin\psi_3 & 0 \\ -\sin\psi_3 & \cos\psi_3 & 0 \\ 0 & 0 & 1 \end{bmatrix} \begin{bmatrix} 1 & 0 & 0 \\ 0 & \cos\phi_3 & \sin\phi_3 \\ 0 & -\sin\phi_3 & \cos\phi_3 \end{bmatrix}$$

[Expression 15]

$$\begin{bmatrix} \cos(\theta_3 + \Delta\theta) & 0 & -\sin(\theta_3 + \Delta\theta) \\ 0 & 1 & 0 \\ \sin(\theta_3 + \Delta\theta) & 0 & \cos(\theta_3 + \Delta\theta) \end{bmatrix} \begin{bmatrix} x_w \\ y_w \\ z_w \end{bmatrix}$$

In the above-described manner, a relational expression between the coordinates $(X_w, Y_w, Z_w)$ in the world coordinate system and the coordinates $(X_c, Y_c, Z_c)$ in the camera coordinate system which is expressed using the rotation order of yaw angle, pitch angle, and roll angle is derived.

The calculator 103 outputs the pitch angle $\phi_3$ and the roll angle $\varphi_3$ of the calculated parameters as camera installation parameters with respect to the movement flat surface (step S209). Assuming that the vehicle is installed horizontal to the movement flat surface, the camera installation parameters output by the calculator 103 can be adopted as a pitch angle and a roll angle of camera installation parameters with respect to the vehicle. Since the calculated yaw angle $\theta_3 + \Delta\theta$ includes $\Delta\theta$ that is determined by an arbitrarily set point and is an angle which the $X_w$ axis forms with the $X_{w'}$ axis or an angle which the $Z_w$ axis forms with the $Y_{w'}$ axis, the yaw angle cannot be adopted as a yaw angle of the camera installation parameters with respect to the vehicle.

Figure 9:
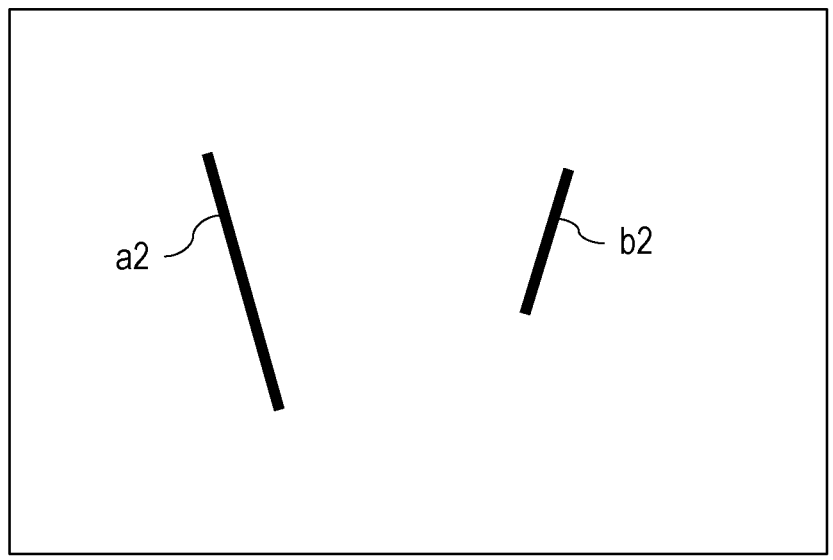
FIG. 9 is an explanatory view showing an image photographed by the camera after movement of a vehicle according to the first embodiment of the present disclosure.

Note that, if the straight lines a and b are line segments or half lines, a yaw angle which is a camera installation parameter with respect to a movement direction of the vehicle may be obtained on the basis of two images photographed before and after movement of the vehicle. FIG. 9 is an image which is photographed by the camera 110 after the vehicle moves straight forward a fixed distance after photographing of the image shown in FIG. 4. A straight line a2 in FIG. 9 corresponds to the first straight line a in FIG. 3 while a straight line b2 corresponds to the second straight line b in FIG. 3.

Figure 10:
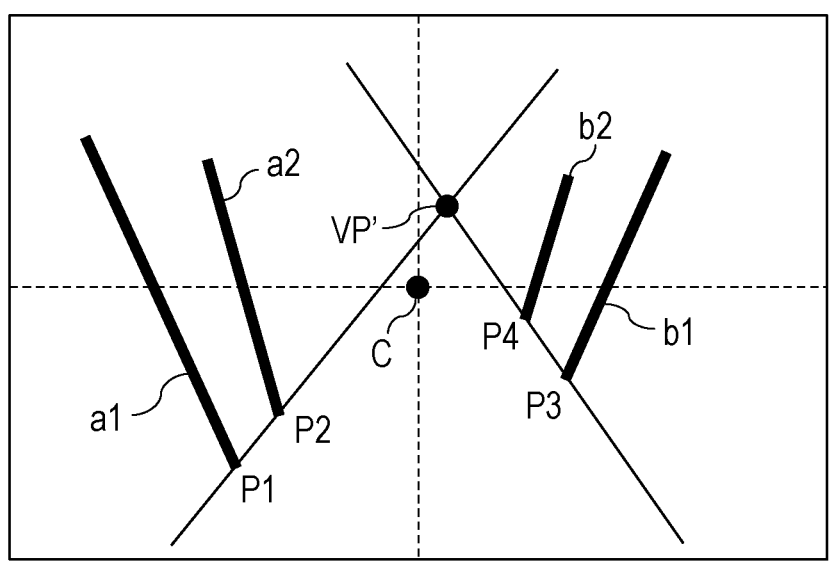
FIG. 10 is a conceptual view for explaining an estimated operation of a yaw angle associated with movement of the vehicle according to the first embodiment of the present disclosure.

FIG. 10 is an image obtained by superimposing the image shown in FIG. 9 on the image shown in FIG. 4. An intersection VP' of a straight line connecting a point P1, which is an intersection of the straight line a1 and the movement flat surface, and a point P2, which is an intersection of the straight line a2 and the movement flat surface, and a straight line connecting a point P3, which is an intersection of the straight line b1 and the movement flat surface, and a point P4, which is an intersection of the straight line b2 and the movement flat surface, is calculated.

Note that the points P1 to P4 need not be intersections of straight lines and the movement flat surface as long as the distances from the points P1 to P4 to the movement flat surface are all equal. For example, if the distances from lower end points of the straight lines a1, a2, b1, and b2 to the movement flat surface and the lengths of the straight lines are all equal, upper end points detected through image processing or the like or the lower end points may be adopted as the points P1 to P4.

A yaw angle $\theta_4$ as a camera installation parameter with respect to the movement direction of the vehicle is calculated from the calculated intersection VP', the pitch angle $\varphi_3$ and the roll angle $\varphi_3$ as camera installation parameters with respect to the movement flat surface calculated by the calculator 103, center coordinates C of the image, and a focal length f of the camera by the equation below Expression 16:

$$\theta_4 = \tan^{-1}((\text{dist}(VC)\sin(\psi_3 + \tan^{-1}(VC_x/-VC_y))) \cdot \cos \varphi_3/f) \quad \text{[Expression 16]}$$

where $VC_x$ represents the difference between an X coordinate of the intersection VP' and an X coordinate of the image center coordinates C, and $VC_y$ represents the difference between a Y coordinate of the intersection VP' and a Y coordinate of the image center coordinates C.

The camera installation parameter calculation method described here is merely exemplary, and camera installation parameters may be calculated using a different method.

The camera installation parameter conversion method described here is merely exemplary, and camera installation parameters may be converted using a different method.

In the present embodiment, the extractor 102 extracts a linearly-extending line substantially perpendicular to the movement flat surface. Two points which are to be connected to form a straight line substantially perpendicular to the movement flat surface may be extracted, the two points may be connected to form a straight line, and the straight line may be adopted as a linearly-extending line substantially perpendicular to the movement flat surface.

The present embodiment has been described in the context of a camera installed at a movable body. The present disclosure, however, is not limited to a case where a camera is installed at a movable body, and a camera may be fixed on a wall or a ceiling, like a security camera.

The calibration apparatus according to the first embodiment of the present disclosure may be implemented by dedicated hardware or by recording a program for implementing the function of the calibration apparatus on a computer-readable storage medium and causing a computer to load and execute the recorded program.

The storage medium may be mounted in the camera 110, and the camera 110 may be configured as a camera having a calibration function.

The distance between the straight line a and the straight line b is desired to be such that a photographed image includes the straight lines a and b. For example, the distance may be 50 cm or 10 m.

A surface on which a movable body moves is a flat surface, two lines extracted by the extractor 102 are straight lines, and a movement flat surface and the two straight lines are substantially perpendicular to each other. A flat surface, a straight line, and perpendicularity having strict accuracy are not requirements in the present disclosure. The accuracy of calculating camera installation parameters depends on the accuracy of a flat surface, a straight line, and perpendicularity. The accuracy of a flat surface, a straight line, and perpendicularity is desired to achieve the accuracy of calculating installation parameters required by an application or the like. For example, a surface for movement may be a bumpy surface or a curved surface, two lines extracted by the extractor 102 may be curved lines or broken lines, and a movement flat surface and two straight lines may not be strictly perpendicular to each other.

As described above, the calibration apparatus according to the first embodiment of the present disclosure can calculate camera installation parameters with respect to a flat surface without use of two sets of parallel lines on the flat surface, with respect to which camera installation parameters are to be obtained but with use of two linearly-extending lines substantially perpendicular to the flat surface.

Second Embodiment

A calibration apparatus according to a second embodiment of the present disclosure will be described below.

Figure 11:
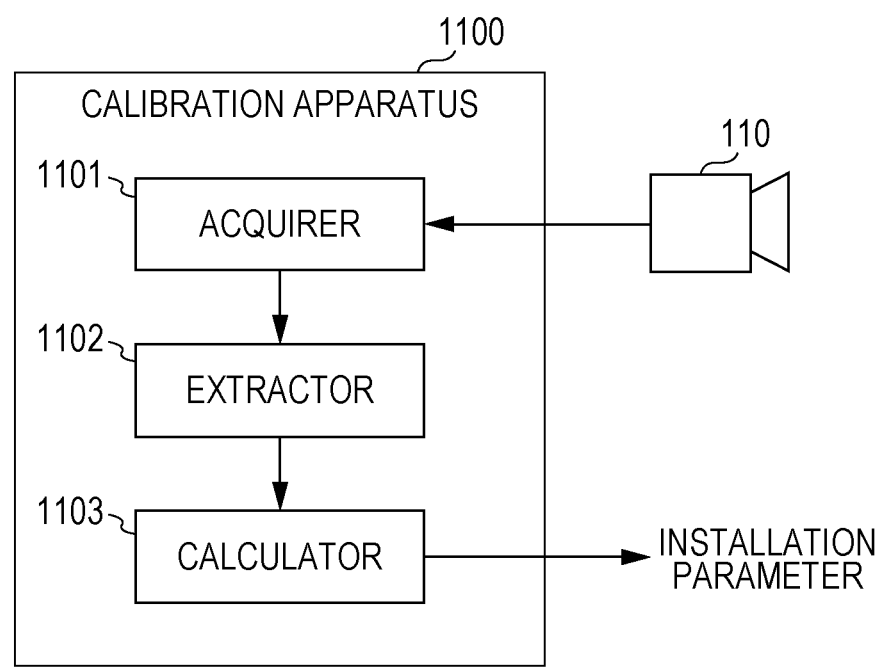
FIG. 11 is a block diagram showing an example of the configuration of a calibration apparatus according to a second embodiment of the present disclosure.

FIG. 11 is a block diagram showing the configuration of the calibration apparatus according to the second embodiment of the present disclosure.

In FIG. 11, a calibration apparatus 1100 includes an acquirer 1101 which acquires an image, including one linearly-extending line substantially perpendicular to a movement flat surface (for example, a road surface), photographed by a camera 110 installed at a vehicle, an extractor 1102 which extracts the linearly-extending line substantially perpendicular to the movement flat surface from the image acquired by the acquirer 1101 through image processing, and a calculator 1103 which calculates camera installation parameters with respect to the movement flat surface from the linearly-extending line extracted by the extractor 1102.

Figure 12:
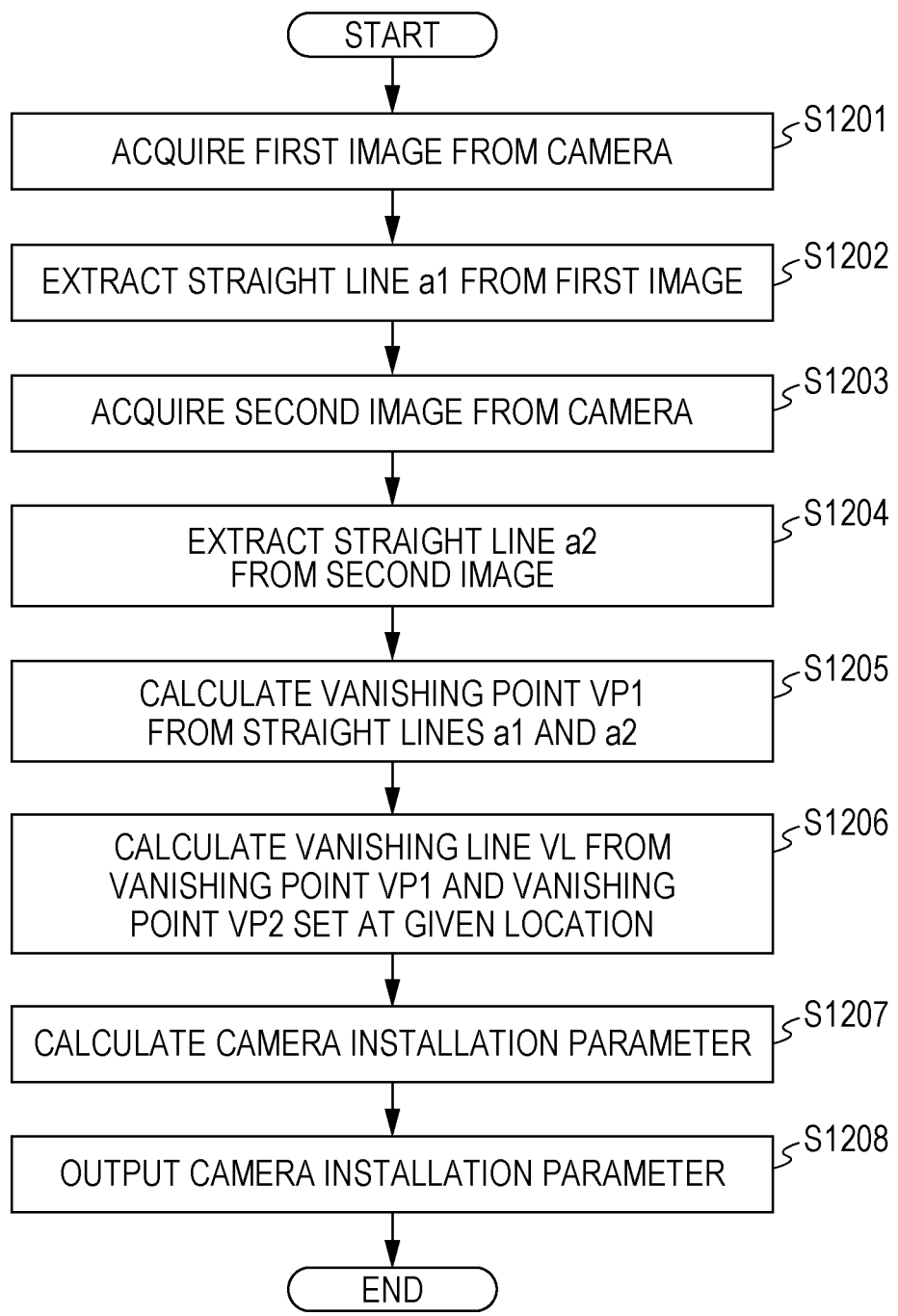
FIG. 12 is a flowchart showing an example of the operation of the calibration apparatus according to the second embodiment of the present disclosure.
Figure 13:
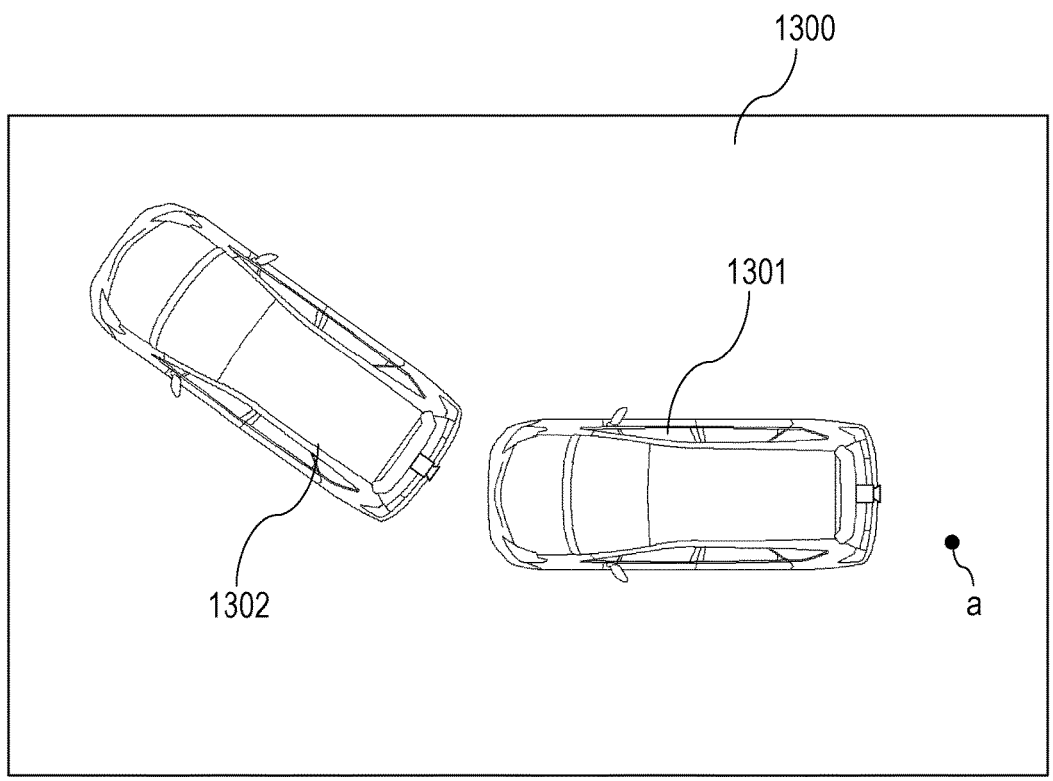
FIG. 13 is an explanatory view showing how the calibration apparatus according to the second embodiment of the present disclosure acquires an image from a camera.

FIG. 12 is a flowchart showing the operation of the calibration apparatus 1100. FIG. 13 is an explanatory view showing how the acquirer 1101 of the calibration apparatus 1100 acquires an image from the camera 110.

In FIG. 13, a straight line a is a linearly-extending line substantially perpendicular to a movement flat surface 1300. The straight line a is one substantially perpendicular linearly-extending line which is drawn on, for example, a cylindrical solid standing substantially perpendicularly to the movement flat surface 1300 or a flat surface standing substantially perpendicularly to the movement flat surface 1300. A movement flat surface here refers to a smooth surface on which a vehicle moves and may be a surface angled with respect to a horizontal plane.

The acquirer 1101 acquires a photographed image of the straight line a (a first image) from the camera 110 installed at a vehicle 1301 which is arranged at a first image acquisition location shown in FIG. 13 (step S1201).

Figure 14:
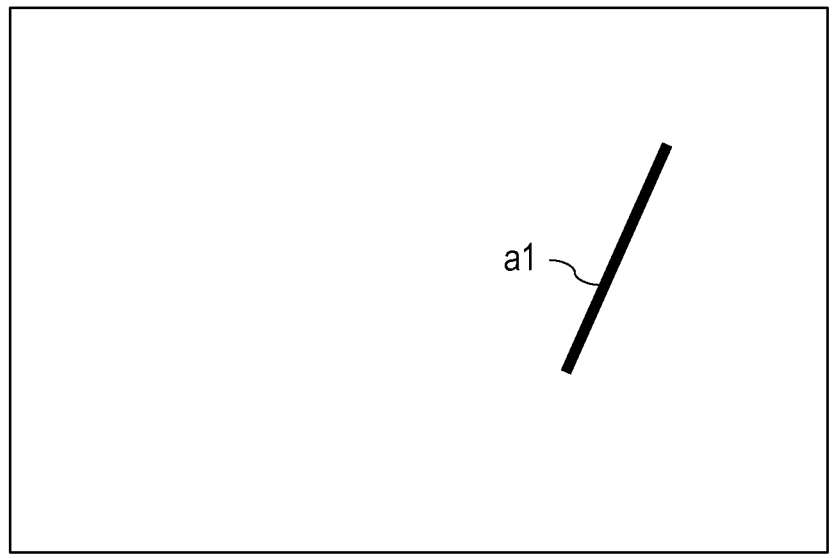
FIG. 14 is an explanatory view showing a first image photographed by the camera according to the second embodiment of the present disclosure.
Figure 15:
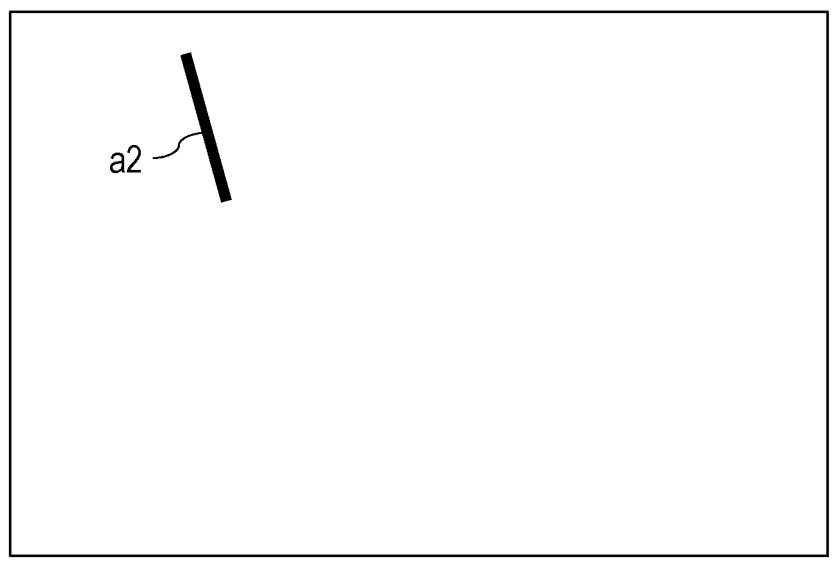
FIG. 15 is an explanatory view showing a second image photographed by the camera according to the second embodiment of the present disclosure.

FIG. 15 is an explanatory view showing the first image acquired by the acquirer 1101 in step S1201. A straight line a1 in FIG. 14 corresponds to the straight line a in FIG. 13.

The image acquired by the acquirer 1101 is input to the extractor 1102. The extractor 1102 extracts the straight line a1 from the input image through image processing, such as comparing luminance at pixels of the image (step S1202).

The acquirer 1101 acquires a photographed image of the straight line a (a second image) from the camera 110 installed at a vehicle 1302 which is arranged at a second image acquisition location after vehicle movement shown in FIG. 13 (step S1203).

FIG. 15 is an explanatory view showing the second image acquired by the acquirer 1101 in step S1203. A straight line a2 in FIG. 15 corresponds to the straight line a in FIG. 13.

The image acquired by the acquirer 1101 is input to the extractor 1102. The extractor 1102 performs the same processing as in step S1202 and extracts the straight line a2 from the input image (step S1204).

The straight line a1 extracted in step S1202 and the straight line a2 extracted in step S1204 are input to the calculator 1103.

The calculator 1103 calculates camera installation parameters with respect to the movement flat surface from the straight lines a1 and a2 extracted by the extractor 1102 and a vanishing point set at a given location.

The calculator 1103 calculates, as a vanishing point VP1, an intersection of a straight line as an extended line of the straight line a1 extracted by the extractor 1102 and a straight line as an extended line of the straight line a2 (step S1205).

The calculator 1103 calculates, as a vanishing line VL, a straight line passing through the vanishing point VP1 calculated in step S1205 and a vanishing point VP2 set at a given location different from that of the vanishing point VP1 (step S1206).

Figure 16:
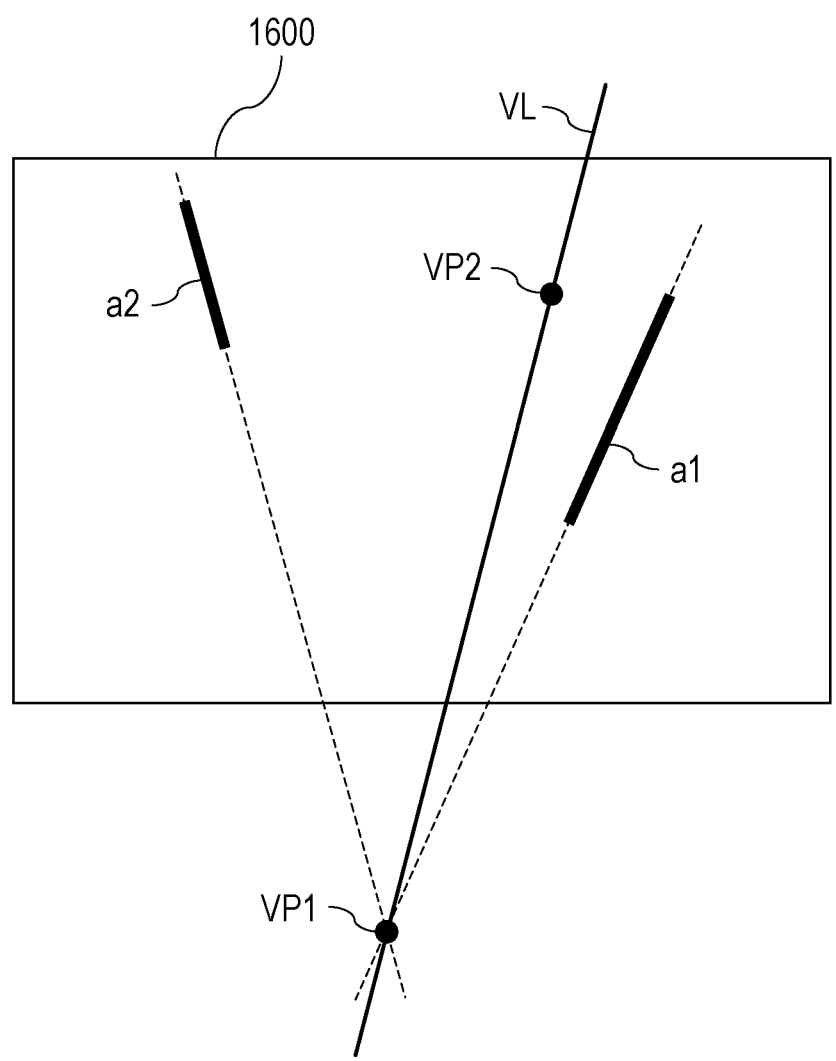
FIG. 16 is a conceptual view for explaining the operation of a calculator according to the second embodiment of the present disclosure.

FIG. 16 shows an example of the positional relation among the vanishing point VP1, the vanishing point VP2, and the vanishing line VL. In FIG. 16, the vanishing point VP2 is present within an image 1600 but may be present at any location as long as the location is in an image space.

As described in the first embodiment, the calculator 1103 calculates camera installation parameters with respect to the movement flat surface using coordinates of the vanishing point VP1, the vanishing line VL, and a focal length of the camera 110 (step S1207) and outputs a calculation result (step S1208).

Note that, if the straight line a is a line segment, a yaw angle which is a camera installation parameter with respect to a movement direction of the vehicle may be simultaneously obtained by causing the vehicle to move straight forward. An intersection VP' of a straight line, connecting an intersection of the straight line a1 and the movement flat surface and an intersection of the straight line a2 and the movement flat surface, and a straight line, connecting an upper end point of the straight line a1 and an upper end point of the straight line a2, is calculated. Note that straight lines used to calculate the intersection VP' need not be a straight line, connecting the intersection of the straight line a1 and the movement flat surface and the intersection of the straight line a2 and the movement flat surface, and a straight line, connecting the upper end point of the straight line a1 and the upper end point of the straight line a2. The straight lines may be each a straight line connecting points equidistant from the movement flat surface in a real space.

The yaw angle as the camera installation parameter with respect to the movement direction of the vehicle is calculated from the calculated intersection VP', a pitch angle and a roll angle as camera installation parameters with respect to the movement flat surface calculated by the calculator 1103, center coordinates of the image, and the focal length.

In the present embodiment, the extractor 1102 extracts a linearly-extending line substantially perpendicular to the movement flat surface. Two points which are to be connected to form a straight line substantially perpendicular to the movement flat surface may be extracted, the two points may be connected to form a straight line, and the straight line may be adopted as a linearly-extending line substantially perpendicular to the movement flat surface.

In the present embodiment, the same straight line a is photographed at the first image acquisition location before the movement and at the second image acquisition location after the movement. Different linearly-extending lines substantially perpendicular to the movement flat surface may be acquired at the first image acquisition location before the movement and at the second image acquisition location after the movement.

The distance between the first image acquisition location and the second image acquisition location is desired to be such that the first and second images include the straight line a. For example, the distance may be 50 cm or 10 m.

The calibration apparatus shown in FIG. 11 may be incorporated in a camera, and the camera may be configured as a camera having a calibration function.

As described above, since a linearly-extending line substantially perpendicular to the movement flat surface on an image photographed before vehicle movement and a linearly-extending line substantially perpendicular to the movement flat surface on the image photographed after the vehicle movement are both substantially perpendicular to the movement flat surface in a real space, the calibration apparatus according to the second embodiment of the present disclosure can calculate camera installation parameters with respect to the movement flat surface using a vanishing point calculated from the two straight lines.

What is claimed is:

1. A calibration apparatus comprising:
an acquirer which acquires an image including two real linear line segments based on two different objects, respectively, photographed at an identical time, from a camera installed on a movable body, the two real linear line segments being substantially perpendicular to a movement flat surface on which the movable body moves;
an extractor which extracts the two real linear line segments from the image acquired by the acquirer;
a calculator which calculates a first vanishing point from two extended lines of the two real linear line segments that are extracted by the extractor and sets any point other than the first vanishing point as a second vanishing point, and calculates a vanishing line which passes through the first and second vanishing points, and calculates a camera installation parameter with respect to the movement flat surface, on a basis of coordinates of the first and second vanishing points and the vanishing line; and
a transmitter which transmits the camera installation parameter;
wherein the camera measures the distance from the movable body to an object using the camera installation parameter.

2. The calibration apparatus according to claim 1, further comprising the camera which acquires the image.

3. A calibration method comprising:
acquiring an image including two real linear line segments based on two different objects, respectively, photographed at an identical time, from a camera installed on a movable body, the two real linear line segments being substantially perpendicular to a movement flat surface on which the movable body moves;
extracting the two real linear line segments from the acquired image through image processing;
calculating a first vanishing point from two extended lines of the extracted two real linear line segments and setting any point other than the first vanishing point as a second vanishing point, and calculating a vanishing line which passes through the first and second vanishing points, and calculating an installation parameter for the camera with respect to the movement flat surface, on a basis of coordinates of the first and second vanishing points; and
transmitting the installation parameter;
wherein the camera measures the distance from the movable body to an object using the camera installation parameter.

4. A calibration apparatus comprising:
an acquirer which acquires a first image and a second image from a camera installed on the movable body, the first image being photographed at a first time and including a first real linear line segment substantially perpendicular to a movement flat surface on which a movable body moves, and the second image being photographed at a second time after movement of a movable body after the first time and including a second real linear line segment substantially perpendicular to the movement flat surface, the second real linear line segment being based on a photographed object identical to that of the first real linear line segment;

an extractor which extracts the first real linear line segment from the first image and the second real linear line segment from the second image through image processing; and a calculator which calculates a first vanishing point from a first extended line of the first real linear line segment extracted from the first image by the extractor and a second extended line of the second real linear line segment extracted from the second image by the extractor and sets any point other than the first vanishing point as a second vanishing point, and calculates a vanishing line which passes through the first and second vanishing points, and calculates an installation parameter for the camera with respect to the movement flat surface, on a basis of coordinates of the first and second vanishing points and the vanishing line; and a transmitter which transmits the installation parameter;

wherein the camera measures the distance from the movable body to an object using the camera installation parameter.

5. The calibration apparatus according to claim 4, further comprising the camera which acquires the image.

6. A calibration method comprising:

acquiring a first image including a first real linear line segment substantially perpendicular to a movement flat surface on which a movable body moves, from a camera installed on the movable body, at a first time;

extracting the first real linear line segment from the first image through image processing;

acquiring a second image including a second real linear line segment substantially perpendicular to the movement flat surface, at a second time after movement of the movable body after the first time, the second real linear line segment being based on a photographed object identical to that of the first real linear line segment;

extracting the second linear line segment from the second image through image processing;

calculating a first vanishing point from a first extended line of the first real linear line segment and a second extended line of the second real linear line segment and setting any point other than the first vanishing point as a second vanishing point;

calculating a vanishing line which passes through the first and second vanishing points;

calculating an installation parameter for the camera with respect to the movement flat surface, on a basis of coordinates of the first and second vanishing points and the vanishing line; and transmitting the installation parameter;

wherein the camera measures the distance from the movable body to an object using the camera installation parameter.

7. The calibration apparatus according to claim 1, wherein the two real linear line segments substantially perpendicular to the movement flat surface includes a range of required perpendicularity for calculating the camera installation parameter.

8. The calibration apparatus according to claim 1, wherein the two real linear line segments are along a direction perpendicular to the movement flat surface, and are extending upwardly from the movement flat surface.

9. The calibration apparatus according to claim 1, wherein the two real linear line segments are identical to a $Y_c$ axis of the camera extending upwardly from the camera, and along a direction perpendicular to the $Z_c$ axis and the $X_c$ axis.

10. The calibration apparatus according to claim 1, wherein the two real linear line segments are two bars standing substantially perpendicular to the movement flat surface.

11. The calibration apparatus according to claim 1, wherein the camera installation parameter with respect to the movement flat surface is calculated by the calculator by calculating a camera installation parameter with respect to a surface substantially perpendicular to the movement flat surface, on a basis of coordinates of the first vanishing point and the vanishing line, then transforming the camera installation parameter with respect to the surface substantially perpendicular to the movement flat surface into the camera installation parameter with respect to the movement flat surface.

12. The calibration apparatus according to claim 4, wherein the camera installation parameter with respect to the movement flat surface is calculated by the calculator by calculating a camera installation parameter with respect to a surface substantially perpendicular to the movement flat surface, on a basis of coordinates of the first vanishing point and the vanishing line, then transforming the camera installation parameter with respect to the surface substantially perpendicular to the movement flat surface into the camera installation parameter with respect to the movement flat surface.

* * * * *